(12) United States Patent
Oguchi et al.

(10) Patent No.: US 7,886,062 B2
(45) Date of Patent: Feb. 8, 2011

(54) PACKET RELAYING METHOD AND PACKET RELAYING SYSTEM

(75) Inventors: Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 11/443,097

(22) Filed: May 31, 2006

(65) Prior Publication Data

US 2007/0180139 A1 Aug. 2, 2007

(30) Foreign Application Priority Data

Jan. 30, 2006 (JP) .............................. 2006-020800

(51) Int. Cl.
*G06F 15/16* (2006.01)

(52) U.S. Cl. ...................... 709/228; 709/245; 709/242; 370/401; 370/465; 370/466; 370/467; 370/474; 370/475; 370/476

(58) Field of Classification Search ....................... None
See application file for complete search history.

(56) References Cited

U.S. PATENT DOCUMENTS

| | | | | |
|---|---|---|---|---|
| 6,128,664 | A * | 10/2000 | Yanagidate et al. | 709/228 |
| 6,425,008 | B1 * | 7/2002 | Lecheler et al. | 709/224 |
| 6,567,405 | B1 * | 5/2003 | Borella et al. | 370/389 |
| 6,725,264 | B1 * | 4/2004 | Christy | 709/225 |
| 7,002,924 | B2 * | 2/2006 | Braun et al. | 370/254 |
| 7,047,314 | B2 * | 5/2006 | Sato et al. | 709/238 |
| 7,099,319 | B2 * | 8/2006 | Boden et al. | 370/389 |
| 7,139,841 | B1 * | 11/2006 | Somasundaram et al. | 709/245 |
| 7,327,721 | B2 * | 2/2008 | Balasaygun et al. | 370/352 |
| 7,366,188 | B2 * | 4/2008 | Kim | 370/401 |
| 7,370,097 | B2 * | 5/2008 | Hashimoto | 709/223 |
| 7,383,357 | B2 * | 6/2008 | Leichter et al. | 709/249 |
| 2002/0097721 | A1 * | 7/2002 | McKenzie et al. | 370/392 |

(Continued)

FOREIGN PATENT DOCUMENTS

JP 200022757 1/2000

(Continued)

OTHER PUBLICATIONS

Notification of Reason for Rejection Office Action issued in corresponding Japanese patent application No. 2006-020800 dated Aug. 31, 2010.

*Primary Examiner*—Joseph E Avellino
*Assistant Examiner*—Dung B Huynh
(74) *Attorney, Agent, or Firm*—Hanify & King, P.C.

(57) ABSTRACT

At the time of exchanging routing information of a remote site, it is examined whether there is duplicated routing information, and when the duplicated routing information exists, an address conversion rule is generated. With this, when performing communication, address conversion is performed only for the communication to a site having a duplicated network address. In case of communication to a site having no duplicated network address, by performing IP communication intact, it becomes possible to omit unnecessary address conversion processing in a gateway. Also, when there is a duplicated address, by assigning a new network address which is not used in a site under a gateway to the duplicated address included in the routing information, and distributing the newly assigned address, it becomes possible to transmit a packet to a gateway appropriate to each destination, when there are a plurality of gateways in a subnet.

10 Claims, 14 Drawing Sheets

U.S. PATENT DOCUMENTS

| | | | |
|---|---|---|---|
| 2002/0124066 A1* | 9/2002 | Chang et al. | 709/223 |
| 2002/0126667 A1* | 9/2002 | Oguchi | 370/389 |
| 2002/0165982 A1* | 11/2002 | Leichter et al. | 709/244 |
| 2002/0186698 A1* | 12/2002 | Ceniza | 370/401 |
| 2003/0093561 A1* | 5/2003 | Christian et al. | 709/245 |
| 2003/0152068 A1* | 8/2003 | Balasaygun et al. | 370/356 |
| 2003/0158962 A1* | 8/2003 | Keane et al. | 709/238 |
| 2003/0169766 A1* | 9/2003 | Ogawa | 370/466 |
| 2003/0219011 A1* | 11/2003 | Han | 370/352 |
| 2004/0073704 A1* | 4/2004 | Paunikar et al. | 709/245 |
| 2005/0083955 A1* | 4/2005 | Guichard et al. | 370/409 |
| 2006/0120317 A1* | 6/2006 | Zheng | 370/315 |
| 2006/0168321 A1* | 7/2006 | Eisenberg et al. | 709/238 |
| 2009/0034539 A1* | 2/2009 | Kawai et al. | 370/400 |

FOREIGN PATENT DOCUMENTS

| | | |
|---|---|---|
| JP | 2004-304235 | 10/2004 |
| JP | 2005311507 | 11/2005 |

* cited by examiner

FIG. 4

| | | |
|---|---|---|
| Withdrawn Routes Length (2bytes)=0 | | 0 |
| Total Path Attribute Length (2bytes) | | 38 |
| Attribute Flags (1bytes) | Attribute Type (1bytes) | 0x14 |
| Attribute Length (1bytes) | | 34 |
| Address Family Identifier(2Bytes) | | 1(ipv4) |
| Subsequent Address Family Identifier(1Byte) | | 128(vpn) |
| Length of Network Address of Next Hop(1Byte) | | 4 |
| Network Address of Next Hop | | 133.160.10.1 |
| Number of SNPAs(1Byte) | | 0 |
| Length(1Byte) | | 12 |
| prefix(12Byte) | | aa<br>10.25.165.0 |
| Length(1Byte) | | 12 |
| prefix(12Byte) | | aa<br>10.25.166.0 |

FIG. 5a  GATEWAY A1 DST ADDRESS CONVERSION TABLE

| PRE-CONVERSION DESTINATION ADDRESS | POST-CONVERSION DESTINATION ADDRESS |
|---|---|
| 192.170.10.0/24 | 10.25.165.0/24 |

FIG. 5b  GATEWAY A1  SRC ADDRESS CONVERSION TABLE

| PRE-CONVERSION SOURCE ADDRESS | POST-CONVERSION SOURCE ADDRESS |
|---|---|
| 10.25.165.0/24 | 192.170.10.0/24 |

FIG. 5c  GATEWAY A1  ROUTING TABLE

| ROW NUMBER | DESTINATION prefix | NEXT HOP ROUTER | OUTPUT IF | ADDRESS CONVERSION FLAG |
|---|---|---|---|---|
| 1 | 10.25.165.0/24 | a1 | IF1 | S |
| 2 | 10.25.166.0/24 | a2 | IF1 | 0 |
| 3 | 192.170.10.0/24 | B1(GW) | IF0 | D |

FIG. 6a  GATEWAY B1  DST ADDRESS CONVERSION TABLE

| PRE-CONVERSION DESTINATION ADDRESS | POST-CONVERSION DESTINATION ADDRESS |
|---|---|
| 192.168.10.0/24 | 10.25.165.0/24 |

FIG. 6b  GATEWAY B1  SRC ADDRESS CONVERSION TABLE

| PRE-CONVERSION SOURCE ADDRESS | POST-CONVERSION SOURCE ADDRESS |
|---|---|
| 10.25.165.0/24 | 192.168.10.0/24 |

FIG. 6c  GATEWAY B1  ROUTING TABLE

| ROW NUMBER | DESTINATION prefix | NEXT HOP ROUTER | OUTPUT IF | ADDRESS CONVERSION FLAG |
|---|---|---|---|---|
| 1 | 10.25.161.0/24 | b1 | IF1 | 0 |
| 2 | 10.25.162.0/24 | b2 | IF1 | 0 |
| 3 | 10.25.163.0/24 | b3 | IF1 | 0 |
| 4 | 10.25.164.0/24 | b4 | IF1 | 0 |
| 5 | 10.25.165.0/24 | b5 | IF1 | S |
| 6 | 192.168.10.0/24 | A1(GW) | IF0 | D |

FIG. 7a

GATEWAY B2 DST ADDRESS CONVERSION TABLE

| PRE-CONVERSION DESTINATION ADDRESS | POST-CONVERSION DESTINATION ADDRESS |
|---|---|
| 192.169.10.0/24 | 10.25.161.0/24 |

FIG. 7b

GATEWAY B2 SRC ADDRESS CONVERSION TABLE

| PRE-CONVERSION SOURCE ADDRESS | POST-CONVERSION SOURCE ADDRESS |
|---|---|
| 10.25.161.0/24 | 192.169.10.0/24 |

FIG. 7c

GATEWAY B2 ROUTING TABLE

| DESTINATION prefix | NEXT HOP ROUTER | OUTPUT IF | ADDRESS CONVERSION |
|---|---|---|---|
| 10.25.161.0/24 | b1 | IF1 | 0 |
| 10.25.162.0/24 | b2 | IF1 | 0 |
| 10.25.163.0/24 | b3 | IF1 | 0 |
| 10.25.164.0/24 | b4 | IF1 | 0 |
| 10.25.165.0/24 | b5 | IF1 | 0 |
| 192.169.10.0/24 | C1(GW) | IF0 | 1 |
| 192.180.10.0/24 | b5 | IF1 | 1 |

FIG. 8a  GATEWAY C1   DST ADDRESS CONVERSION TABLE

| PRE-CONVERSION DESTINATION ADDRESS | POST-CONVERSION DESTINATION ADDRESS |
|---|---|
| 192.180.10.0/24 | 10.25.161.0/24 |

FIG. 8b  GATEWAY C1   SRC ADDRESS CONVERSION TABLE

| PRE-CONVERSION SOURCE ADDRESS | POST-CONVERSION SOURCE ADDRESS |
|---|---|
| 10.25.161.0/24 | 192.180.10.0/24 |

FIG. 8c  GATEWAY C1   ROUTING TABLE

| DESTINATION prefix | NEXT HOP ROUTER | OUTPUT IF | ADDRESS CONVERSION |
|---|---|---|---|
| 10.25.159.0/24 | c1 | IF1 | 0 |
| 10.25.160.0/24 | c2 | IF1 | 0 |
| 10.25.161.0/24 | c3 | IF1 | 0 |
| 192.169.10.0/24 | c3 | IF1 | 1 |
| 192.180.10.0/24 | B2(GW) | IF0 | 1 |

ROUTING TABLE IN INTERNAL SITE ROUTER a1

| ROW NUMBER | ADDRESS prefix | NEXT HOP ROUTER | OUTPUT IF |
|---|---|---|---|
| 1 | 10.25.165.0/24 | a1 | IF1 |
| 2 | 10.25.166.0/24 | a2 | IF0 |
| 3 | 192.170.10.0/24 | A1(GW) | IF0 |

ROUTING TABLE IN INTERNAL SITE ROUTER b5

| ROW NUMBER | ADDRESS prefix | NEXT HOP ROUTER | OUTPUT IF |
|---|---|---|---|
| 1 | 10.25.161.0/24 | b1 | IF0 |
| 2 | 10.25.162.0/24 | b2 | IF0 |
| 3 | 10.25.163.0/24 | b3 | IF0 |
| 4 | 10.25.164.0/24 | b4 | IF0 |
| 5 | 10.25.165.0/24 | b5 | IF1 |
| 6 | 192.168.10.0/24 | B1(GW) | IF0 |
| 7 | 192.169.10.0/24 | B2(GW) | IF0 |

FIG. 11a

| DNS HEADER | opcode=query |
|---|---|
| QUERY | termA.siteA.kigyou.co.jp |
| REPLY | BLANK |
| AUTHORITY | |
| ADDITIONAL INFORMATION | |

FIG. 11b

| DNS HEADER | opcode=reply |
|---|---|
| QUERY | termA.siteA.kigyou.co.jp |
| REPLY | 10.25.165.5 |
| AUTHORITY | |
| ADDITIONAL INFORMATION | |

FIG. 11c

| DNS HEADER | opcode=reply |
|---|---|
| QUERY | termA.siteA.kigyou.co.jp |
| REPLY | 192.168.10.5 |
| AUTHORITY | |
| ADDITIONAL INFORMATION | |

FIG. 14a  GATEWAY A1  ROUTING TABLE

| ROW NUMBER | DESTINATION prefix | NEXT HOP ROUTER | OUTPUT IF | ADDRESS CONVERSION FLAG |
|---|---|---|---|---|
| 1 | 10.25.165.0/24 | a1 | IF1 | 0 |
| 2 | 10.25.166.0/24 | a2 | IF1 | 0 |
| 3 | 192.170.10.0/24 | a1 | IF1 | D |
| 4 | 192.168.10.0/24 | B1(GW) | IF0 | S |

FIG. 14b  GATEWAY B1  ROUTING TABLE

| ROW NUMBER | DESTINATION prefix | NEXT HOP ROUTER | OUTPUT IF | ADDRESS CONVERSION FLAG |
|---|---|---|---|---|
| 1 | 10.25.161.0/24 | b1 | IF1 | 0 |
| 2 | 10.25.162.0/24 | b2 | IF1 | 0 |
| 3 | 10.25.163.0/24 | b3 | IF1 | 0 |
| 4 | 10.25.164.0/24 | b4 | IF1 | 0 |
| 5 | 10.25.165.0/24 | b5 | IF1 | 0 |
| 6 | 192.168.10.0/24 | b5 | IF1 | D |
| 7 | 192.170.10.0/24 | A1(GW) | IF0 | S |

PACKET RELAYING METHOD AND PACKET RELAYING SYSTEM

CROSS-REFERENCE TO RELATED APPLICATIONS

This application is based upon and claims the benefit of priority from the prior Japanese Patent Application No. 2006-20800, filed on Jan. 30, 2006, the entire contents of which are incorporated herein by reference.

BACKGROUND OF THE INVENTION

1. Field of the Invention

The present invention relates to a packet relaying method in a packet relay network, and more particularly a packet relaying method and packet relaying apparatus in an extranet for interconnecting a plurality of different networks.

2. Description of the Related Art

Today, enterprises and organizations have a plurality of sites in different places, which are interconnected through an IT infrastructure. To achieve such the configuration, there are increased cases of connecting between each site through an IP-VPN (Internet Protocol-Virtual Private Network) being feasible with less cost than the use of dedicated lines. Each site is configured of a subnet group including at least one subnet. Using the IP-VPN conforming to RFC (Request for Comments) 2547 bis by IETF (Internet Engineering Task Force), which has been in wide use in recent years, the sites in different regions can be interconnected using a virtual network overlaid on the Internet. In such a corporate network connected through the VPN, generally, network administrators in the organization coordinate so that assigned addresses are not duplicated in the respective sites within the organization, thereby avoiding the occurrence of contradiction in the corporate network connected through the VPN. Thus, network operation can be simplified using a function of dynamically exchanging routing information of a remote site through the VPN.

Today, for the purpose of business cooperation between different enterprises, etc., there are cases of interconnecting networks of each organization. Such the formation of connection is called extranet. Generally, in a corporate network and a home network, private addresses are set for internal apparatus. In many cases, each network is designed independently, using the same address range in different enterprises. As a result, such a situation that network addresses duplicate among the sites may arise when the extranet is implemented.

Particularly, in an IP-VPN conforming to RFC 2547, routing information within the site is interchanged using the extended BGP (Border Gateway Protocol). When different address ranges are used unintentionally among the sites of different organizations to be connected, interconnectivity can be secured by exchanging routing information in an ordinary manner. However, when network addresses duplicate, because of route contradiction, a problem of communication inability between the sites arises.

As a prior art for connecting the sites having a duplicated address between each other, there is an art called NAT-dst provided by Juniper Networks, Inc. The NAT (Network Address Translation) is an address conversion technique for mutually converting a private IP address, which is valid only within a certain organization, and a global IP address, which is available for an external access to the Internet. According to the above technique, it is necessary to statically set a NAT rule to the gateways locating at the borders of the sites having the duplicated network address (IP address), corresponding to a destination address. In case there are a plurality of sites having duplicated addresses, it is required to set the NAT rules for as many as the number of combinations of the sites, causing a troublesome work for setting. Further, when a network address (IP address) of a site is modified, modification of the gateway settings is necessary, which also causes a complicated work to cope therewith. Accordingly, a method for performing automatic address conversion and setting becomes necessary.

As a method for dynamically generating an address conversion table when communicating through the Internet between the sites possibly having a duplicated address, for example, an invention disclosed in the official gazette of the Japanese Unexamined Patent Publication No. 2004-304235 is known. In the above technique, a domain name system (DNS) is utilized for the signaling of setting.

According to the above invention, a network system includes a private network of transmission source, a private network of destination, and the Internet connecting both the above private networks. Also, a gateway (border router) is provided between each private network and the Internet. The gateway has an address conversion function, as well as a DNS server function within the private network. Further, a DNS server is provided in the Internet. The DNS server resolves a top domain name in the private network, and also resolves a DNS server address for address resolution in the private network. When a terminal in one private network accesses another private address network, the terminal first requests the gateway, which also functions as DNS server in the private network of the transmission source (hereafter referred to as source private network), to resolve the name. The gateway inquires a DNS server in the Internet about a gateway address managing from the top domain to the domain concerned. The gateway of the transmission source (hereafter referred to as source gateway) transmits a name resolution query of the destination address to the destination gateway. In response to the above query, the destination gateway generates an address reachable from the Internet side, corresponding to the destination terminal. The destination gateway then replies the source gateway with the generated address. On receipt of the destination terminal address, the source gateway generates a dummy IP address corresponding to the above received address, and stores the above correspondence into a table. The source gateway also replies the terminal originally issuing the query with the name of the destination terminal together with the correspondence to the dummy IP address. The source terminal transmits to the gateway a packet by specifying the above address as destination address. The gateway then converts the destination address in the packet according to the table, and transmits to the gateway in the remote site. When the packet reaches the generated address, the destination gateway converts the destination address into the destination terminal address corresponding to the received destination address, and then transmits the packet to the terminal.

According to the above method using the DNS, the NAT rule setting can be automated by setting the conversion rule triggered by the DNS at the time of communication between the sites having a duplicated address. However, the address conversion rule is set wastefully at all times, that is, even at the time of communication between the sites having no duplicated address therebetween. In other words, in the method for setting address conversion by use of the DNS, it is not possible to distinguish a case of the NAT rule to be applied from a case not to be applied, based on whether or not the address duplication is existent. When the sites are interconnected through the VPN, address conversion is not always needed at the time of communication, because the connection is not given through the Internet: as long as an address is not duplicated in between the sites, address conversion is unnecessary. Execution of address conversion for the entire addresses wastes gateway resources, and increases a gateway load, which may cause degradation of packet relaying performance.

In addition, according to the above-mentioned method using the DNS, a route becomes necessary in the site for transferring the packet having the converted address from the terminal having been issued the DNS query to the gateway in the site. When there is one gateway, and a default route has been distributed statically to the site, the packet destined to the converted address can be transferred to the gateway. However, when there are a plurality of gateways, using the default route, the packet can only be transferred to one gateway. Further, it is possible to statically distribute the routes to the respective gateways on a basis of each converted address. However, when the number of conversion addresses generated by the DNS increases, and the conversion addresses are generated from a plurality of network address ranges, it becomes necessary to perform static route settings to the gateways for a plurality of times. This produces a troublesome work for the administrator.

SUMMARY OF THE INVENTION

Accordingly, it is an object of the present invention to provide a packet relaying method and packet relaying apparatus, in which address conversion is performed only when there is a duplicated address.

It is also an object of the present invention to provide a packet relaying method and packet relaying apparatus, which can distribute a route corresponding to a converted address to a plurality of gateways in the site.

In order to attain the aforementioned objects, as a first packet relaying method according to the present invention for relaying a packet from a first network to a second network, first relaying apparatus in the first network and second relaying apparatus in the second network decide whether an identical network address mutually duplicated in between the first network and the second network exists. When the identical network address exists, the first relaying apparatus distributes a first network address corresponding to the identical network address internally to the first network, and the second relaying apparatus distributes a second network address corresponding to the identical network address internally to the second network. Further, when the identical network address is included in a packet transferred from the first network to the second network via the first relaying apparatus and the second relaying apparatus, the first relaying apparatus converts the identical network address included in the received packet into the first network address, or the second relaying apparatus converts the identical address included in the received packet into the second network address.

As a second packet relaying method according to the present invention, in the above first packet relaying method, when the first network address is included in the received packet, the first relaying apparatus converts the first network address into the identical network address, and when the second network address is included in the received packet, the second relaying apparatus converts the second network address into the identical network address.

As a third packet relaying method according to the present invention, in the above second packet relaying method, when the identical network address is included as the source address of the packet, and the first network address is included as the destination address of the packet, the first relaying apparatus converts the first network address specified as destination address into the identical network address, and the second relaying apparatus converts the identical network address specified as source address into the second network address.

As a fourth packet relaying method according to the present invention, in the above second packet relaying method, when the identical network address is included as the source address of the packet, and the second network address is included as the destination address of the packet, the first relaying apparatus converts the identical network address specified as source address into the first network address, and the second relaying apparatus converts the second network address specified as destination address into the identical network address.

As a fifth packet relaying method according to the present invention, in the above fourth packet relaying method, the first relaying apparatus distributes the first network address internally to the second network via the second relaying apparatus, and the second relaying apparatus distributes the second network address internally to the first network via the first relaying apparatus.

As a sixth packet relaying method according to the present invention, in the above first packet relaying method, the first relaying apparatus attaches a first identifier to the entire network addresses in the first network, and transmits to the second relaying apparatus the network addresses with the first identifier attached thereto, and the second relaying apparatus attaches a second identifier to the entire network addresses in the second network, and transmits to the first relaying apparatus the network addresses with the second identifier attached thereto. Further, the first relaying apparatus compares the network addresses in the second network, being received from the second relaying apparatus, with the network addresses in the first network, so as to decide whether or not the identical network address exists, and the second relaying apparatus compares the network addresses in the first network, being received from the first relaying apparatus, with the network addresses in the second network, so as to decide whether or not the identical network address exists.

As a first configuration of a packet relaying system according to the present invention, the packet relaying system for relaying a packet from a first network to a second network includes first relaying apparatus in the first network and second relaying apparatus in the second network, which are interconnected through a predetermined network. The first relaying apparatus in the first network and the second relaying apparatus in the second network decide whether or not the identical network address mutually duplicated in between the first network and the second network exists. When the identical network address exists, the first relaying apparatus distributes a first network address corresponding to the identical network address internally to the first network, and the second relaying apparatus distributes a second network address corresponding to the identical network address internally to the second network. Further, when the identical network address is included in a packet being transferred from the first network to the second network via the first relaying apparatus and the second relaying apparatus, the first relaying apparatus converts the identical network address included in the received packet into the first network address, or the second relaying apparatus converts the identical network address included in the received packet into the second network address.

As a second configuration of a packet relaying system according to the present invention, in the above first configuration, when the first network address is included in the received packet, the first relaying apparatus converts the first network address into the identical network address, and when the second network address is included in the received packet, the second relaying apparatus converts the second network address into the identical network address.

As a third configuration of a packet relaying system according to the present invention, in the above second configuration, when the identical network address is included as the source address of the packet, and the first network address is included as the destination address of the packet, the first relaying apparatus converts the first network address specified as destination address into the identical network address, and the second relaying apparatus converts the identical network address specified as source address into the second network address.

As a fourth configuration of a packet relaying system according to the present invention, in the above second configuration, when the identical network address is included as the source address of the packet, and the second network address is included as the destination address of the packet, the first relaying apparatus converts the identical network address specified as source address into the first network address, and the second relaying apparatus converts the second network address specified as destination address into the identical network address.

As a fifth configuration of a packet relaying system according to the present invention, in the above fourth configuration, the first relaying apparatus distributes the first network address internally to the second network via the second relaying apparatus, and the second relaying apparatus distributes the second network address internally to the first network via the first relaying apparatus.

As a sixth configuration of a packet relaying system according to the present invention, in the above first configuration, the first relaying apparatus attaches a first identifier to the entire network addresses in the first network, and transmits to the second relaying apparatus the network addresses with the first identifier attached thereto, and the second relaying apparatus attaches a second identifier to the entire network addresses in the second network, and transmits to the first relaying apparatus the network addresses with the second identifier attached thereto. Further, the first relaying apparatus compares the network addresses in the second network, being received from the second relaying apparatus, with the network addresses in the first network, so as to decide whether or not the identical network address exists, and the second relaying apparatus compares the network addresses in the first network, being received from the first relaying apparatus, with the network addresses in the second network, so as to decide whether or not the identical network address exists.

According to the present invention, when exchanging routing information of a remote site, it is examined whether duplication of routing information exists, and when duplication exists, an address conversion rule is generated. With this, communication is made after performing address conversion only in case of communication with a site having duplicated network address, whereas in case of communication with a site not having duplication, IP communication is performed without address conversion. Thus, unnecessary address conversion processing in the gateway can be omitted.

Further, when there is address duplication, a gateway assigns a new network address, which is not duplicated in the self-network with the network address included in the routing information, and distributes the new network address to the site. With this, the routes to the respective gateways are distributed prior to the communication. When a plurality of gateways exist in a subnet, and packets are to be passed through different gateways depending on the packet destination sites, a communication terminal in a site can transmit each packet to an appropriate gateway depending on each destination address.

Further scopes and features of the present invention will become more apparent by the following description of the embodiments with the accompanied drawings.

BRIEF DESCRIPTION OF THE DRAWINGS

FIG. 4 shows an example of a BGP UPDATE message transmitted from a gateway A1 to a gateway B1.

FIGS. 5a to 5c show diagrams illustrating DST address conversion table, SRC address conversion table, and routing table in a gateway A1.

FIGS. 6a to 6c show diagrams illustrating DST address conversion table, SRC address conversion table, and routing table in a gateway B1.

FIGS. 7a to 7c show diagrams illustrating DST address conversion table, SRC address conversion table, and routing table in a gateway B2.

FIGS. 8a to 8c show diagrams illustrating DST address conversion table, SRC address conversion table, and routing table in a gateway C.

FIGS. 11a to 11c show diagrams illustrating examples of a DNS query, a DNS reply, and a DNS reply including a converted address.

FIGS. 14a and 14b show diagrams illustrating routing tables in gateways A1 and B1, generated by a route distribution sequence according to a second embodiment.

DETAILED DESCRIPTION OF THE PREFERRED EMBODIMENTS

The preferred embodiment of the present invention is described hereinafter referring to the charts and drawings. However, it is noted that the scope of the present invention is not limited to the embodiments described below.

<Outline of the present invention>

Figure 1:
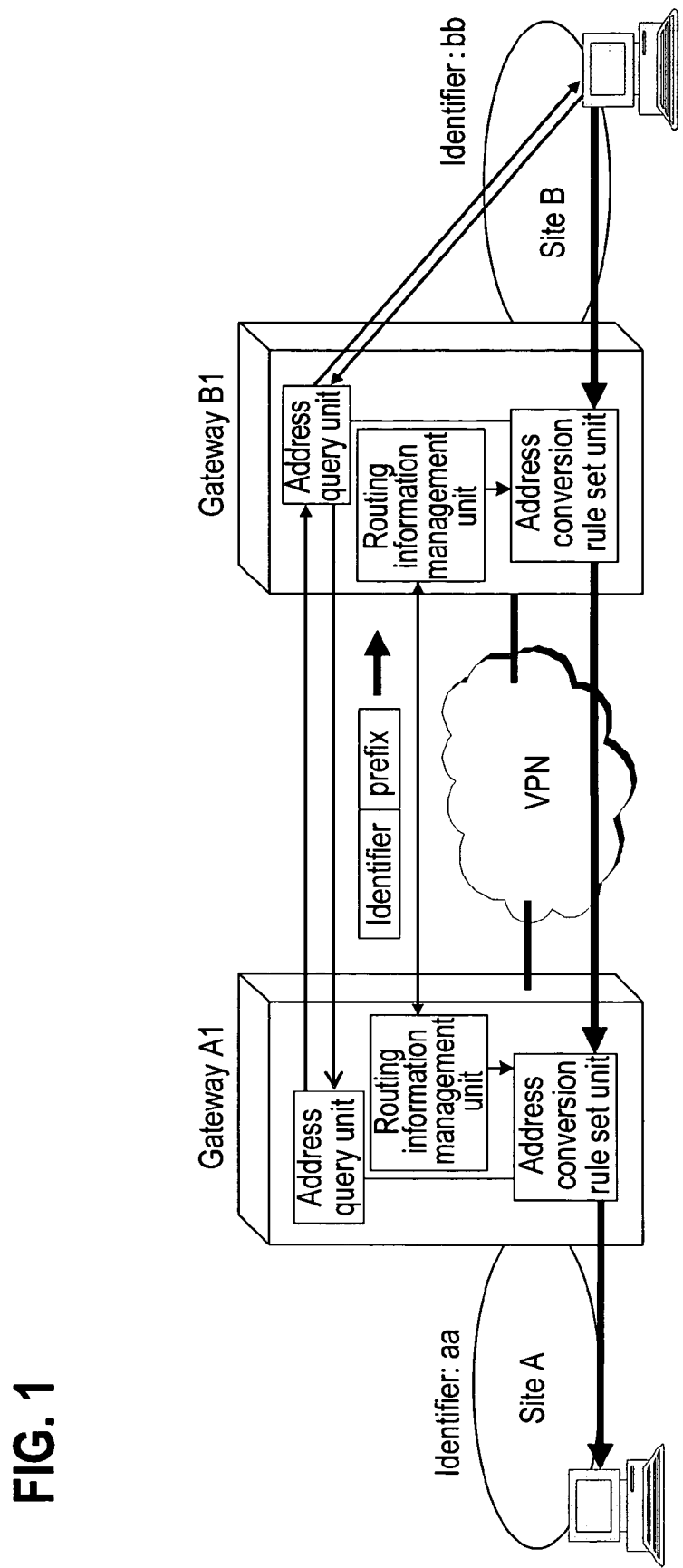
FIG. 1 shows a diagram illustrating an exemplary basic configuration for realizing a packet relaying method according to the present invention.

FIG. 1 shows a diagram illustrating an exemplary basic configuration for realizing a packet relaying method according to the present invention. A gateway A1 in a site A and a gateway B1 in a site B are connected through a VPN. Each gateway A1, B1 includes an address query unit, a routing information management unit and an address conversion rule set unit, of which functions are described later.

The gateway A1, B1 in each site exchanges routing information including a network address, with the gateway located in the remote site via the VPN. At this time, the routing information is exchanged after an identifier for uniquely identifying each subnet is added before the network address, so that the network address (IP address) duplicated in between the sites is not confused. For example, the identifier of the site A is 'aa' and the identifier of the site B is 'bb'. With this, the duplicated network address can be exchanged without confusion. Prior to a DNS query from a terminal, on detecting duplication of the network address, the gateway sets an address conversion rule. Specifically, a gateway in one site generates an alternative network address corresponding to the duplicated network address in the opposite site, and sets the address conversion rule. Also, as routing information, the gateway distributes the above alternative network address to the internal routers provided in the self-site, as the duplicated network address in the opposite site. With this, since the route to each gateway is distributed prior to the communication, when a plurality of gateways exist in the subnet, and each packet is transferred through a different gateway depending on each destined site, a packet addressed to an object destination can be forwarded to an appropriate gateway.

For example, when the gateway B1 receives, from the gateway A1 in the site A via the VPN, a DNS reply responding to a DNS query from a terminal subordinate to an internal router provided in the site B, the gateway B1 converts the network address included in the DNS reply to an alternative network address only when conversion is necessary, by referring to the address conversion rule having been set before. The gateway B1 then returns the response to the query source terminal via the internal router. When there is no duplication, the gateway B1 transfers the received DNS reply to the terminal intact, that is, without converting the network address included in the DNS reply.

First Embodiment

Figure 2:
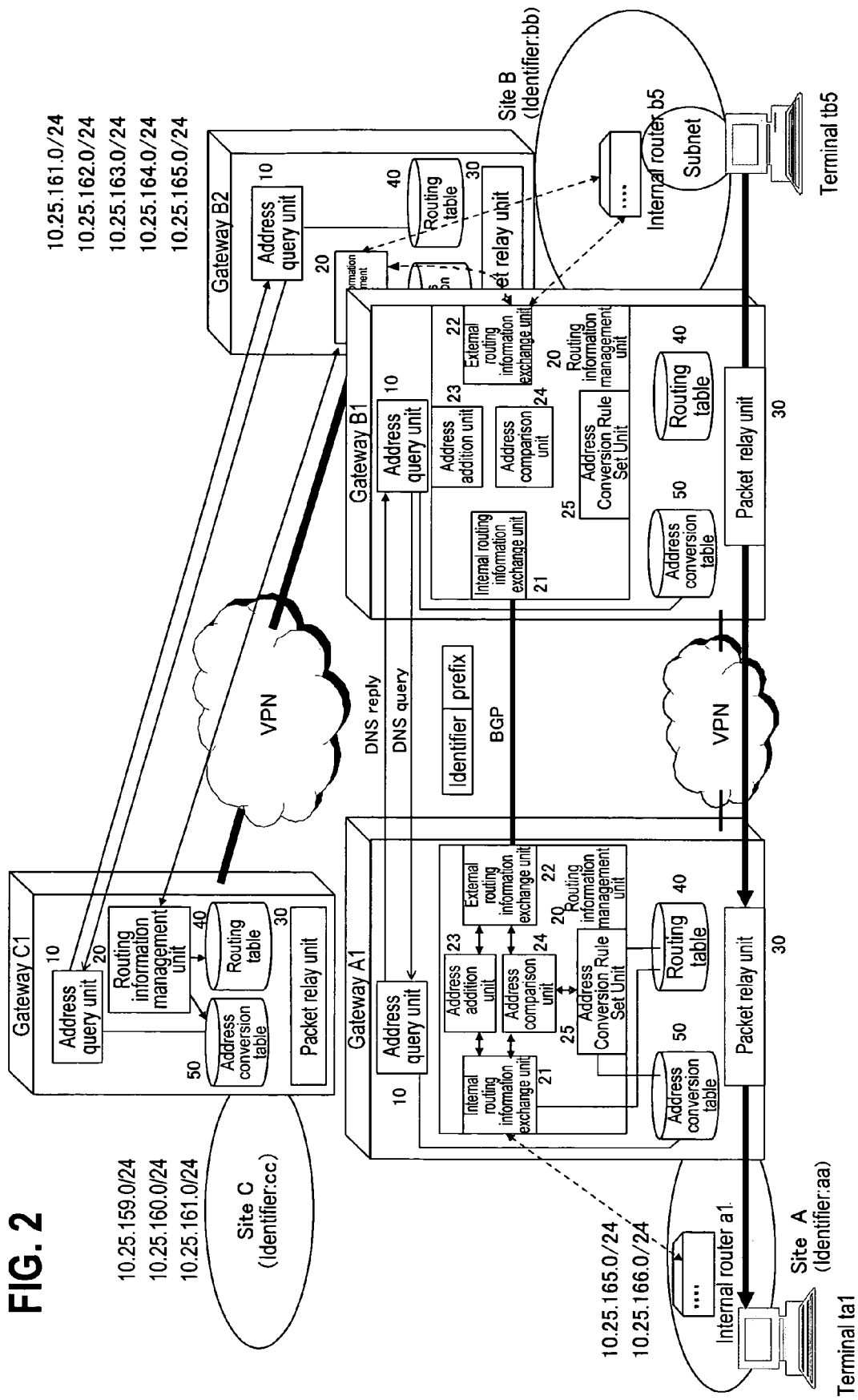
FIG. 2 shows a diagram illustrating an exemplary network system configuration according to an embodiment of the present invention.

FIG. 2 shows a diagram illustrating an exemplary network system configuration according to an embodiment of the present invention. As to the network system configuration, the configuration in the first embodiment is the same as the configuration in a second embodiment which will be described later. A site B is connected to sites A and C, via the VPN. In each site, there are disposed gateways for connecting to other sites. A gateway A1 in the site A is connected to a gateway B1 in the site B, while a gateway C1 in the site C is connected to a gateway B2 in the site B. As such, the site B is connected to the two sites A and C, via the different gateways B1 and B2.

The site A internally has two subnets (10.25.165.0/24, 10.25.166.0/24). The site B internally has five subnets (10.25.161.0/24, 10.25.162.0/24, 10.25.163.0/24, 10.25.164.0/24, 10.25.165.0/24). Also, the site C internally has three subnets (10.25.159.0/24, 10.25.160.0/24, 10.25.161.0/24). Further, in each site, a DNS server (which is implemented as one function of the gateway) is provided for managing the correspondence between the domain name and the IP address of each terminal in the site concerned. Internal site router(s), as well as terminals subordinate to the internal site router, is existent in each subnet.

Now, when a connection is to be made between the site A and the site B through VPN, an IP address of 10.25.165.0/24 is duplicated in between the site A and the site B. Thus, when the IP address is intact, communication between the both subnets cannot be performed.

The configuration of each gateway is described below. Each gateway includes an address query unit 10, a routing information management unit 20, and a packet relay unit 30. Also, as necessary tables, each gateway includes a routing table 40 having routing information, and an address conversion table 50 having address conversion information.

Address query unit 10 has a server function of a domain name system (DNS). On receipt of a domain name resolution request (DNS query) from either a terminal in the site or a DNS server in another site, address query unit 10 responds with a network address (DNS reply) corresponding to the domain name. Namely, the gateway also provides a DNS server function. Further, when the gateway itself does not hold a network address corresponding to the domain name, the gateway of interest transfers the domain name resolution request to another DNS server.

Routing information management unit 20 is constituted of an internal routing information exchange unit 21, an external routing information exchange unit 22, an address addition unit 23, an address comparison unit 24, and an address conversion rule set unit 25.

Internal routing information exchange unit 21 is a processing unit for exchanging routing information with an internal site router, using routing control program such as RIP (Routing information Protocol) and OSPF (Open Shortest Path First).

External routing information exchange unit 22 is a processing unit for exchanging routing information with a gateway in another site router, using a routing control protocol BGP (Border Gateway Protocol).

Address addition unit 23 is a processing unit for transferring the routing information, being received by the internal routing information exchange unit 21 from an internal site router, to the external routing information exchange unit 22, after adding a site identifier.

Address comparison unit 24 is a processing unit for removing a site identifier from the routing information received by the external routing information exchange unit 22 from another gateway, and for examining by comparing whether the above received route is duplicated with the routing information in the site being held by the internal routing information exchange unit 21. Among the routing information received by the external routing information exchange unit 22, a route being not duplicated with an internal address is transferred intact to the internal routing information exchange unit 21. Meanwhile, as to a route being duplicated with an internal address, address comparison unit 24 requests address conversion rule set unit 25 to convert the address, and the converted address is distributed to the internal routing information exchange unit 21.

When address comparison unit 24 detects duplication between the routing information retained in the site and the routing information received from the other gateway, address conversion rule set unit 25 is a processing unit for receiving the request, generating a network address which is not used in routing table 40 so as to remove the duplication, and setting the relation of correspondence therebetween into address conversion table 50. Also, address conversion rule set unit 25 informs address comparison unit 24 of the generated network address, as a reply.

Packet relay unit 30 is a processing unit for relaying a received packet to an appropriate interface IF according to routing table 40. At the time of searching routing table 40, if an address conversion rule adoption flag is set on, packet relay unit 30 refers to address conversion table 50, rewrites the address (destination or source) included in the packet header, and transmits the packet to the interface instructed in routing table 40.

Routing table 40 is a table having routing information which describes the correspondence of a destination address (prefix) necessary for relaying a packet to a next hop router, an output IF, and the necessity/non-necessity of address conversion. Routing information management unit 20 manages routing table 40, and packet relay unit 30 refers to routing table 40 at the time of relaying the packet. Further, address query unit 10 refers to routing table 40 at the time of transmitting a DNS reply.

Address conversion table 50 is a table including SRC (source) address conversion information and DST (destination) address conversion information, for registering the correspondence between a pre-conversion network address and a post-conversion network address in a packet. Address conversion rule set unit 25 manages address conversion table 50, and packet relay unit 30 refers to address conversion table 50 at the time of relaying a packet.

Hereafter, in regard to the operation of the network system shown in FIG. 2 will be described, taking as an example a sequence between the site A and the site B. Additionally, the above sequence is also applicable to a sequence between the site B and the site C. In order to communicate between the sites having a duplicated network address, the following three sequences have to be passed: (1) route distribution sequence; (2) DNS query sequence; and (3) packet transfer sequence. The description will be made phase-by-phase.

(1) Route distribution sequence

Figure 3:
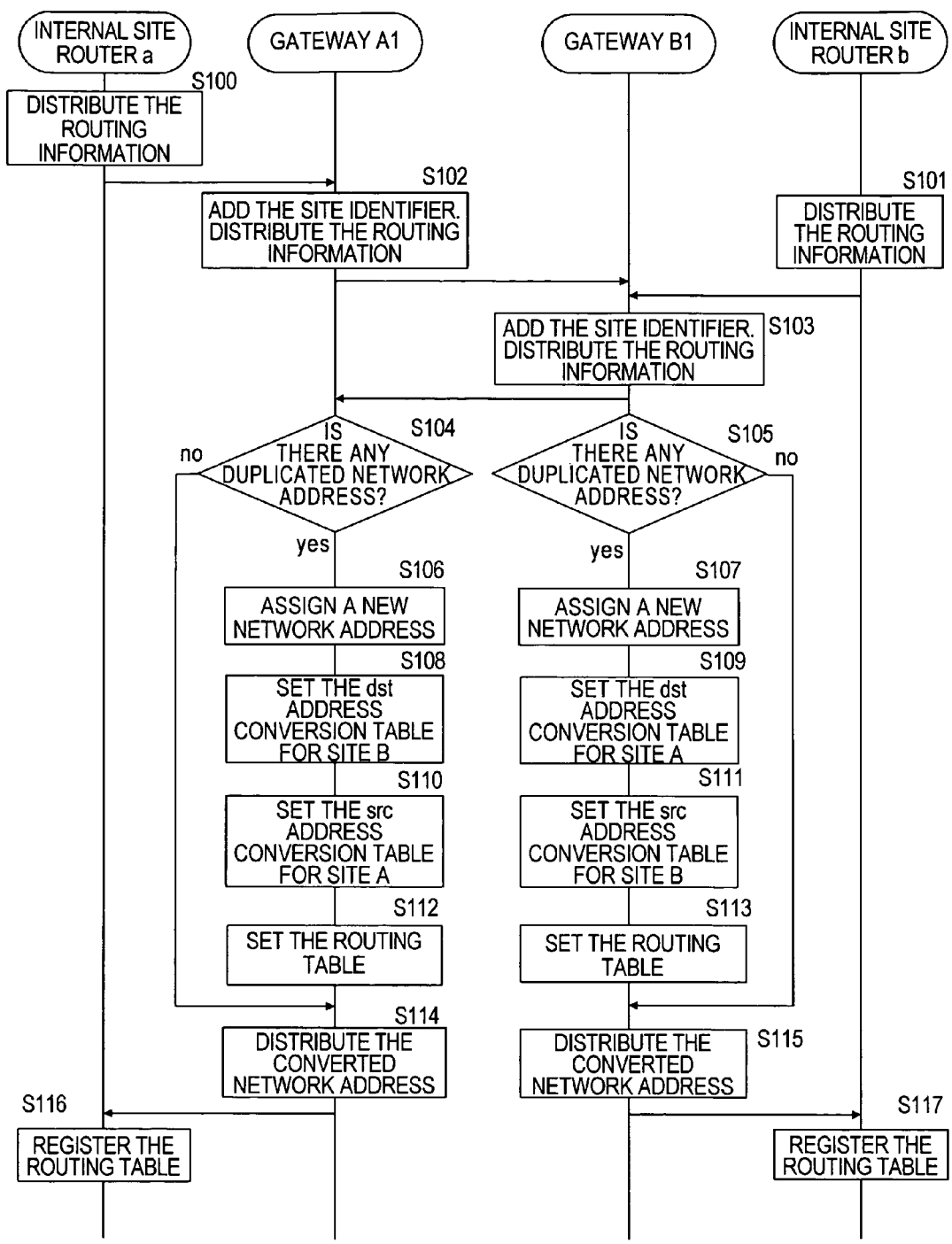
FIG. 3 shows a flowchart of a route distribution sequence according to a first embodiment of the present invention.

FIG. 3 shows a flowchart of a route distribution sequence according to a first embodiment of the present invention. An internal site router 'a' (which indicates each of two internal site routers a1, a2) in a site A distributes routing information to a gateway A1 (S100), and an internal site router 'b' (which indicates each of five internal site routers b1, b2, b3, b4 and b5) in a site B distributes routing information to a gateway B1 (S101). Specifically, each internal site router in each subnet transmits routing information including a network address of the subnet to a gateway. For example, the internal site router a1 in a subnet (10.25.165.0/24) of the site A transmits routing information including a network address (10.25.165.0/24) to the gateway A1. The internal site router a2 in a subnet (10.25.166.0/24) of the site A transmits routing information including a network address (10.25.166.0/24) to the gateway A1. The internal site router b1 in a subnet (10.25.161.0/24) of the site B transmits routing information including a network address (10.25.161.0/24) to the gateway B1. The above is also the case for the internal routers b2, b3, b4 and b5 corresponding to other subnets in the site B. The routing information transmitted from the internal site router 'b' is received in the internal routing information exchange unit 21 of the gateway B1.

Address addition unit 23 in the gateway A1 adds a site identifier to the network address received from the internal site router 'a', so as to transfer to the external routing information exchange unit 22. External routing information exchange unit 22 then transmits the network address, with the site identifier added thereto, to the external routing information exchange unit 22 in the gateway B1 (S102). The site identifier of the site A is, for example, 'aa'. Accordingly, in regard to the subnet (10.25.165.0/24) in the site A, 'aa+(10.25.165.0/24)' is transmitted to the gateway B1.

FIG. 4 shows an example of a BGP UPDATE message transmitted from the gateway A1 to the gateway B1. The BGP UPDATE message includes a network address (prefix) of each subnet in the site A, and the network address has the site identifier added thereto.

Similarly, address addition unit 23 in the gateway B1 adds a site identifier to the network address received from the internal site router 'b', so as to transfer to the external routing information exchange unit 22. External routing information exchange unit 22 transmits a network address, to which the site identifier concerned is added, to the external routing information exchange unit 22 of the gateway A1 (S103). The site identifier of the site B is, for example, 'bb'. Accordingly, in regard to the subnet (10.25.165.0/24) in the site B, 'bb+(10.25.165.0/24)' is transmitted to the gateway A1.

Address comparison unit 24 in the gateway A1 compares the network addresses from the internal site router 'a', received in the internal routing information exchange unit 21, with the network addresses from the gateway B1 received in the external routing information exchange unit 22, so as to decide existence or non-existence of a duplicated network address (S104).

Among the network addresses received from the gateway B1, network addresses not duplicated with the network address of the site A (in the case of the above example, network addresses in the site B other than 10.25.165.0/24) are transferred to the internal routing information exchange unit 21 after the site identifier 'bb' of the site B is deleted, so as to request to distribute internally to the site A.

Among the network addresses received from the gateway B1, as to a network address being duplicated with the network address of the site A (in the case of the above example, 10.25.165.0/24), address conversion rule set unit 25 is requested to perform address conversion.

Address conversion rule set unit 25 assigns a new address 192.170.10.0/24 corresponding to the duplicated network address 10.25.165.0/24 received from address comparison unit 24 (S106). The new address is an address unused in routing table 40, being obtained by examining routing table 40.

Address conversion rule set unit 25 registers the new network address 192.170.10.0/24 into a DST address conversion table for the site B, as a pre-conversion destination address, and also registers the duplicated network address 10.25.165.0/24, as a post-conversion destination address (S108). FIG. 5a shows a diagram illustrating the DST address conversion table for the site B.

Also, address conversion rule set unit 25 registers the duplicated network address 10.25.165.0/24 into an SRC address conversion table for the site A, as a pre-conversion source address, and also registers the new network address 192.170.10.0/24, as a post-conversion source address (S110). FIG. 5b shows a diagram illustrating the SRC address conversion table for the site A.

Further, address conversion rule set unit 25 registers into the routing table the routing information from inside the site A to the new network address 192.170.10.0/24 (S112). FIG. 5c shows the routing table in the gateway A1.

Then, address conversion rule set unit 25 informs address comparison unit 24 of the new network address corresponding to the duplicated network address. Address comparison unit 24 requests the internal routing information exchange unit 21 to distribute the network address of the site B to the internal site router 'a'. At this time, when a new network address is generated, the new network address is transmitted to the internal routing information exchange unit 21 so as to distribute the new network address in place of the duplicated network address. Internal routing information exchange unit 21 distributes the network address of the site B to the internal site router 'a' (S114), and the internal site router 'a' receives and registers the above distributed network address (S116).

In the gateway B1 also, the similar processing is performed. Specifically, when the duplicated network address 10.25.165.0/24 is detected in S105, a new network address 192.168.10.0/24 is assigned to the duplicated network address 10.25.165.0/24 (S107). Further, the registration processing of the DST address conversion table, the SRC address conversion table, and the routing table are executed in the similar manner to the above description (S109, S111 and S113). FIGS. 6a, 6b and 6c show diagrams illustrating DST address conversion table, SRC address conversion table, and routing table of the gateway B1, respectively.

Then, the network address of the site A is distributed to the internal site router 'b' (S115), and the internal site router 'b' receives, and registers, the above distributed network address (S117).

FIGS. 7a, 7b and 7c respectively show diagrams illustrating DST address conversion table, SRC address conversion table, and routing table in the gateway B2. A new network address corresponding to the duplicated network address 10.25.161.0/24 is 192.169.10.0/24.

FIGS. 8a, 8b and 8c respectively show diagrams illustrating DST address conversion table, SRC address conversion table, and routing table in the gateway C1. A new network address corresponding to the duplicated network address 10.25.161.0/24 is 192.180.10.0/24.

Figures 9A, 9B, 10:
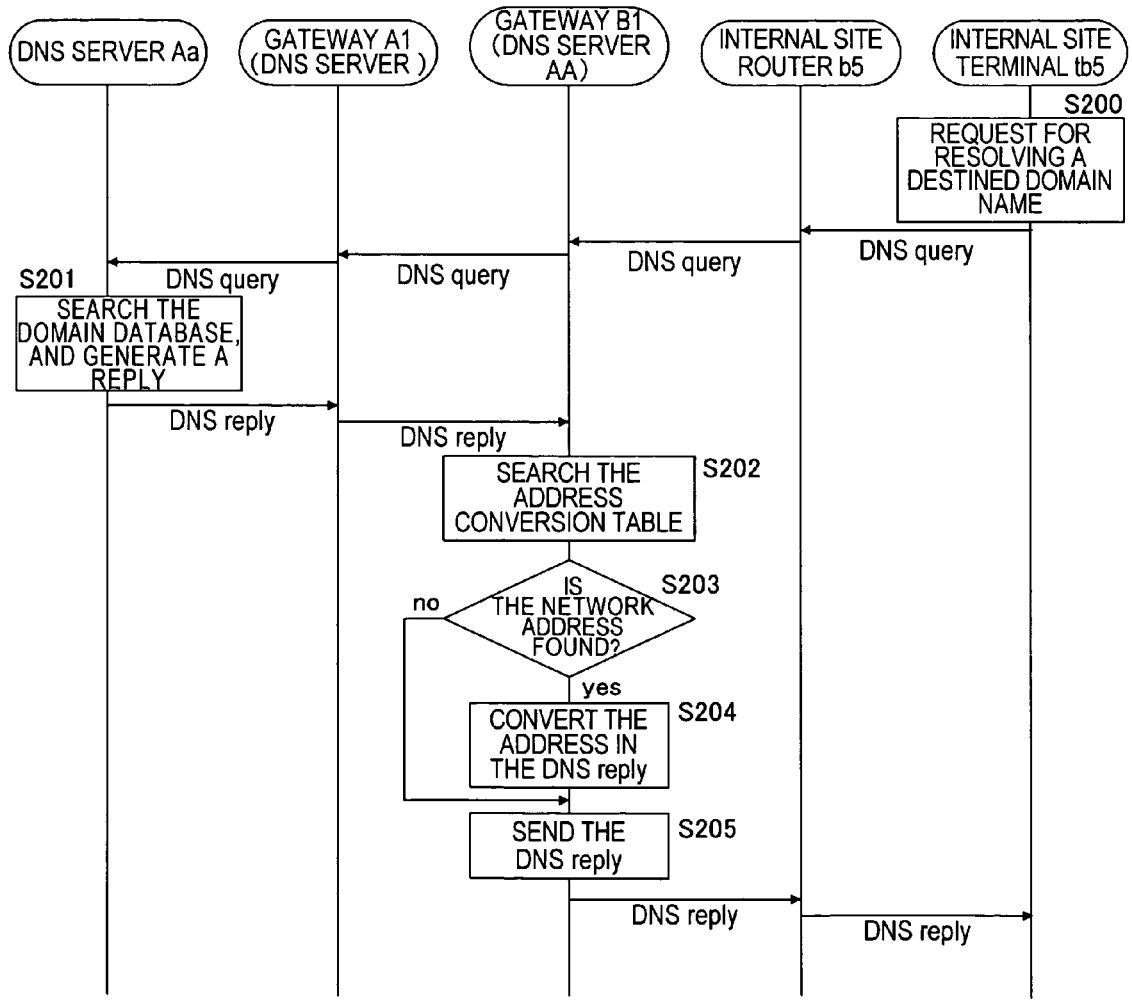
FIGS. 9a and 9b show diagrams illustrating routing tables in internal site routers a1 and b5.
FIG. 10 shows a DNS query sequence flowchart according to a first embodiment of the present invention.

FIGS. 9a, 9b respectively show routing tables in the internal site routers a1 and b5. In the routing table of the internal site router a1 shown in FIG. 9a, a new network address 190.170.10.0/24 for the site B is registered. In the routing table of the internal site router b5 shown in FIG. 9b, a new network address 192.168.10.0/24 for the site A is registered, and further, a new network address 192.169.10.0/24 for the site C is registered.

(2) DNS Query Sequence

FIG. 10 shows a DNS query sequence flowchart according to the first embodiment of the present invention. There is described below the DNS query sequence in a state that address conversion for a duplicated network address can be performed as a result of the route distribution sequence shown in FIG. 3. A case that a terminal tb5 in the site B communicates with a terminal ta1 in a subnet (10.25.165.10/24) of the site A is assumed. The terminal tb5 is also a terminal in a subnet (10.25.165.10/24) of the site B, having the same network address as the terminal ta1.

The terminal tb5 transmits a domain name resolution request, inquiring the network address of the terminal ta1 in the site A (S200). Specifically, first, the terminal tb5 generates a DNS query message using the domain name (for example, termA.siteA.kigyou.co.jp) of the terminal ta1, and transmits the generated message to the gateway B1, which also functions as DNS server of the site B, via the internal site router b5. In FIG. 11a, an example of the DNS query message is shown.

When the gateway B1 internally has an answer (an IP address corresponding to the domain name) to the DNS query, the gateway B1 returns a DNS reply including the above answer. Meanwhile, when the gateway B1 has no answer, the gateway B1 transmits the DNS query to the gateway A1. In the present embodiment, a case that the gateway B1 has no answer is assumed.

When the gateway A1 has no answer to the DNS query internally, the gateway A1 transmits the DNS query to a DNS server Aa in the site A. The DNS server Aa searches a domain name database registered in advance, acquires a network address (IP address) corresponding to the domain name termA.siteA.kigyou.co.jp of the terminal ta1, generates a DNS reply message including the above IP address, and transmits the DNS reply message to the gateway A1 (S201). The IP address of the terminal ta1 is 10.25.165.0/24. In FIG. 11b, an example of the DNS reply message is shown.

The gateway A1 transfers the DNS reply to the gateway B1. On receipt of the DNS reply, the gateway B1 searches the DST address conversion table shown in FIG. 6a (S202). In S203, when the IP address (prefix) included in the DNS reply is already registered in the post-conversion destination address, the gateway B1 converts the IP address in the DNS reply to the pre-conversion destination address (S204). The gateway B1 then transmits the DNS reply including the above converted address to the terminal tb5 via the internal site router b5 (S205). In the present example, the received IP address 10.25.165.0/24 has been registered in the DST address conversion table, and the IP address of interest is converted to a new IP address 192.168.10.0/24. In FIG. 11c, an example of the DNS reply message including the converted address is shown. In S203, when the IP address included in the DNS reply has not been registered in the post-conversion destination address, the received DNS reply is transmitted intact to the terminal tb1.

With this, the terminal tb1 can communicate with the terminal ta1, using the IP address included in the DNS reply.

(3) Packet Transfer Sequence

Figure 12:
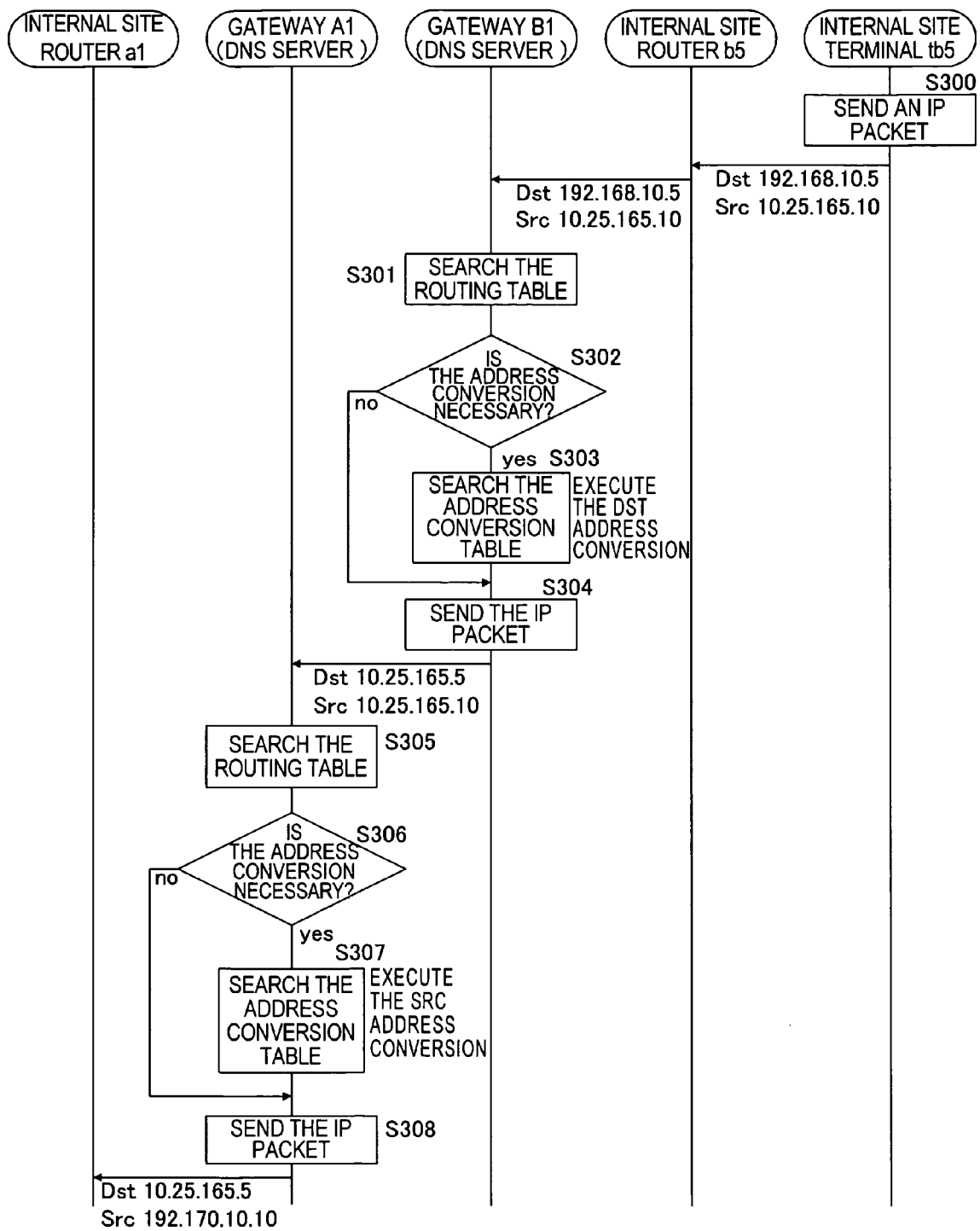
FIG. 12 shows a packet transfer sequence flowchart according to a first embodiment of the present invention.

FIG. 12 shows a packet transfer sequence flowchart according to a first embodiment of the present invention. There is described below the packet transfer sequence in a state that the destination IP address has been acquired through the DNS query sequence shown in FIG. 10. A case of transferring a packet from the terminal tb5 in the site B to the terminal ta1 in the site A is assumed.

The terminal tb5 transmits an IP packet (DST=192.168.10.5, SRC=10.25.165.10) to the internal site router b5, using the IP address having been acquired through the DNS query sequence shown in FIG. 10 (S300). The internal site router b5 searches the routing table (refer to FIG. 9b) generated in the route distribution sequence shown in FIG. 3, selects the gateway B1 as next hop router, and transmits the IP packet to the gateway B1 accordingly.

The gateway B1 searches the routing table (refer to FIG. 6c) (S301), and selects the gateway A1 as next hop router corresponding to the DST address 192.168.10.5, and decides whether there is a necessity of address conversion (S302). As shown in FIG. 6c, in the address 192.168.10.5 of the routing table, there is set a conversion flag D, indicating the necessity of conversion based on the DST address conversion table. Therefore, referring to the DST address conversion table shown in FIG. 6a, the gateway B1 converts the DST address 192.168.10.5 into a DST address 10.25.165.5 (S303), and transmits the IP packet to the gateway A1 (S304). Namely, the IP packet (DST=10.25.165.5, SRC=10.25.165.10) is transmitted to the gateway A1.

On receipt of the IP packet from the gateway B1, the gateway A1 searches the routing table (FIG. 5c) (S305). The gateway A1 selects the internal site router a1 as a next hop router corresponding to the address 10.25.165.0/24, and further decides the necessity of address conversion (S306). As shown in FIG. 5c, in the address 10.25.165.5 of the routing table, there is set a conversion flag S, indicating the necessity of conversion based on the SRC address conversion table. Therefore, referring to the SRC address conversion table shown in FIG. 5b, the gateway A1 converts the SRC address 10.25.165.10 into an SRC address 192.170.10.10 (S307), and transmits the IP packet to the internal site router a1 (S308).

Namely, the IP packet (DST=10.25.165.5, SRC=192.170.10.10) is transmitted to the internal site router a1.

When the terminal ta1 transmits an IP packet to the terminal tb5, the terminal ta1, which receives the IPpacket concerned from the internal site router a1, generates an IP packet, in which the SRC address 192.170.10.10 in the received IP packet is specified as DST address. Then, the IP packet transmitted from the terminal ta1 is transferred on the above-mentioned route in the opposite direction. Then, the DST address is converted in the gateway A1 (refer to FIG. 5a), and the SRC address is converted in the gateway B1 (refer to FIG. 6b). Thus, the terminal tb5 receives the IP packet (DST=10.25.165.10, SRC=192.168.10.5).

Second Embodiment

Hereafter, the second embodiment will be described. A configuration example of the network system according to the second embodiment is the same as shown in FIG. 2. As compared with the first embodiment, in the second embodiment, the type of address conversion to be performed in the gateway B1 and the gateway A1 is different. Specifically, in the first embodiment, the gateway B1 performs DST address conversion, and the gateway A1 performs SRC address conversion. In contrast, in the second embodiment, the gateway B1 performs SRC address conversion, and the gateway A1 performs DST address conversion. Namely, an SRC address is converted on the DST side, while a DST address is converted on the SRC side.

In the first embodiment, the SRC address 10.25.165.10 of the IP packet received in the gateway A1 from the gateway B1 is the same as an address in the site A. When viewed from the gateway A1, there arises a situation that packets which have a SRC address inside the gateway are received from the outside (backbone). In other words, the gateway receives the packet from an unexpected direction. From the viewpoint of ensuring security, there may be a case of setting so as to inhibit the packet reception having such the address. Therefore, preferably, the SRC address and the DST address in the packet received from the backbone may not be duplicated with an internal site address. Accordingly, in the second embodiment, there is provided a sequence that the DST address is converted on the DST side, while the SRC address is converted on the SRC side, so that the address in the received packet is not duplicated with the internal site address.

(4) Route Distribution Sequence

Figure 13:
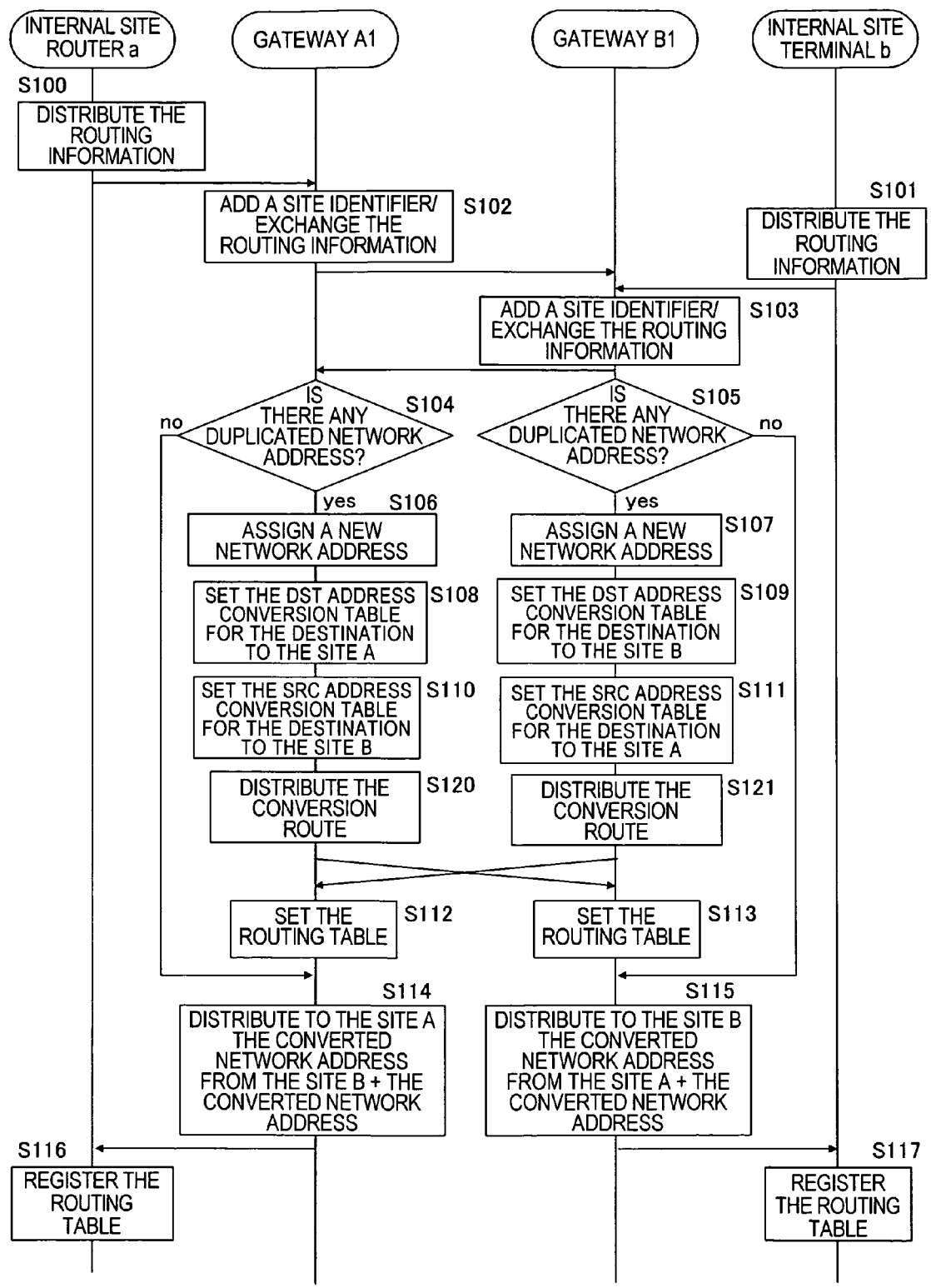
FIG. 13 shows a route distribution sequence flowchart according to a second embodiment of the present invention.

FIG. 13 shows a route distribution sequence flowchart according to the second embodiment of the present invention. The difference from the route distribution sequence according to the first embodiment of the present invention is described below.

As compared to the route distribution sequence in the first embodiment shown in FIG. 3, the route distribution sequence shown in FIG. 13 includes additional processing of distributing new network addresses assigned in each gateway mutually to an opposite gateway. Namely, for a duplicated network address 10.25.165.0/24, the gateway A1, which assigns a new network address 192.170.10.0/24, distributes to the gateway B1 the routing information with respect to the above new network address (S120). At this time, in the gateway A1, the address conversion flag corresponding to the above new network address is set at D (DST address conversion). Meanwhile, in the routing information distributed to the gateway B1, the address conversion flag corresponding to the above new network address is set at S (SRC address conversion).

Similarly, the gateway B1 assigns a new network address 192.168.10.0/24, and the routing information of the above new network address is distributed to the gateway A1 (S121). At this time, in the gateway B1, the address conversion flag corresponding to the above new network address is set at D (DST address conversion), while in the routing information distributed to the gateway A1, the address conversion flag corresponding to the above new network address is set at S (SRC address conversion).

Further, the gateways A1 and B1 respectively set the routing tables including the received new network addresses (S112, S113).

FIGS. 14a, 14b show diagrams illustrating the routing tables in the gateways A1 and B1, generated by the route distribution sequence according to the second embodiment. In the routing table of the gateway A1 shown in FIG. 14a, in the third row, a network of 192.170.10.0/24 newly assigned by the gateway A1 is registered together with the address conversion flag D; and in the fourth row, a new network of 192.168.10.0/24 received from the gateway B1 is registered, with the address conversion flag S. In the routing table of the gateway B1 shown in FIG. 14b, in the sixth row, the network 192.168.10.0/24 newly assigned by the gateway B1 is registered, with the address conversion flag D; and in the seventh row, the new network 192.170.10.0/24 received from the gateway A1 is registered, with the address conversion flag S.

(5) DNS Query Sequence

Figure 15:
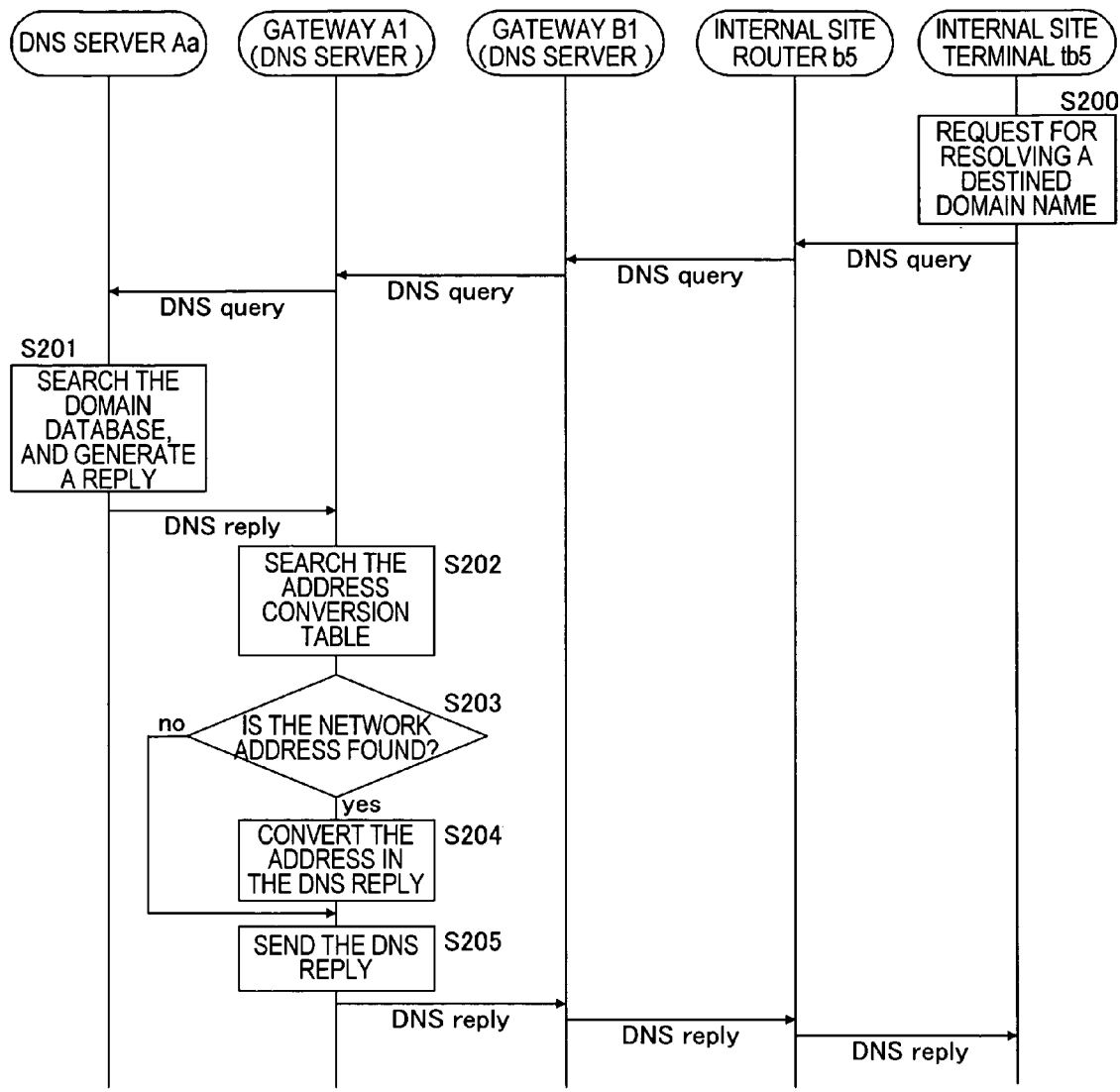
FIG. 15 shows a DNS query sequence flowchart according to a second embodiment of the present invention.

FIG. 15 shows a DNS query sequence flowchart according to the second embodiment of the present invention. The difference from the DNS query sequence flowchart in the first embodiment is described below.

Figure 16:
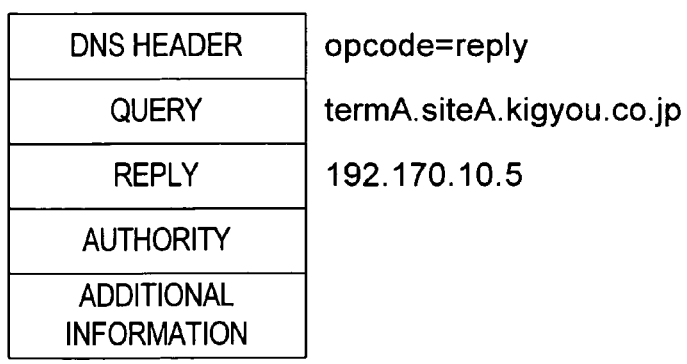
FIG. 16 shows a diagram illustrating a DNS reply including a converted address, according to a second embodiment.

In the first embodiment, in the DNS query sequence shown in FIG. 10, the address specified in the DNS reply is converted on the gateway B1 side. In contrast, the DNS query sequence shown in FIG. 15, the address in the DNS reply is converted on the gateway A1 side (from 10.25.165.0/24 to 192.170.10.0/24), and then the DNS reply is transmitted to the gateway B1. Since the gateway A1 has the routing information of the network address, newly assigned by the gateway B1, through the route distribution sequence shown in FIG. 13, the address conversion can be performed in the gateway A1. In the gateway B1, the network address 10.25.165.0/24 existent in the site B is not received externally. Instead, the converted address 192.170.10.0/24 is received. FIG. 16 shows a diagram illustrating a DNS reply having the converted address in the second embodiment. There is shown a state that the converted address 192.170.10.0/24 is included.

(6) Packet Transfer Sequence

Figure 17:
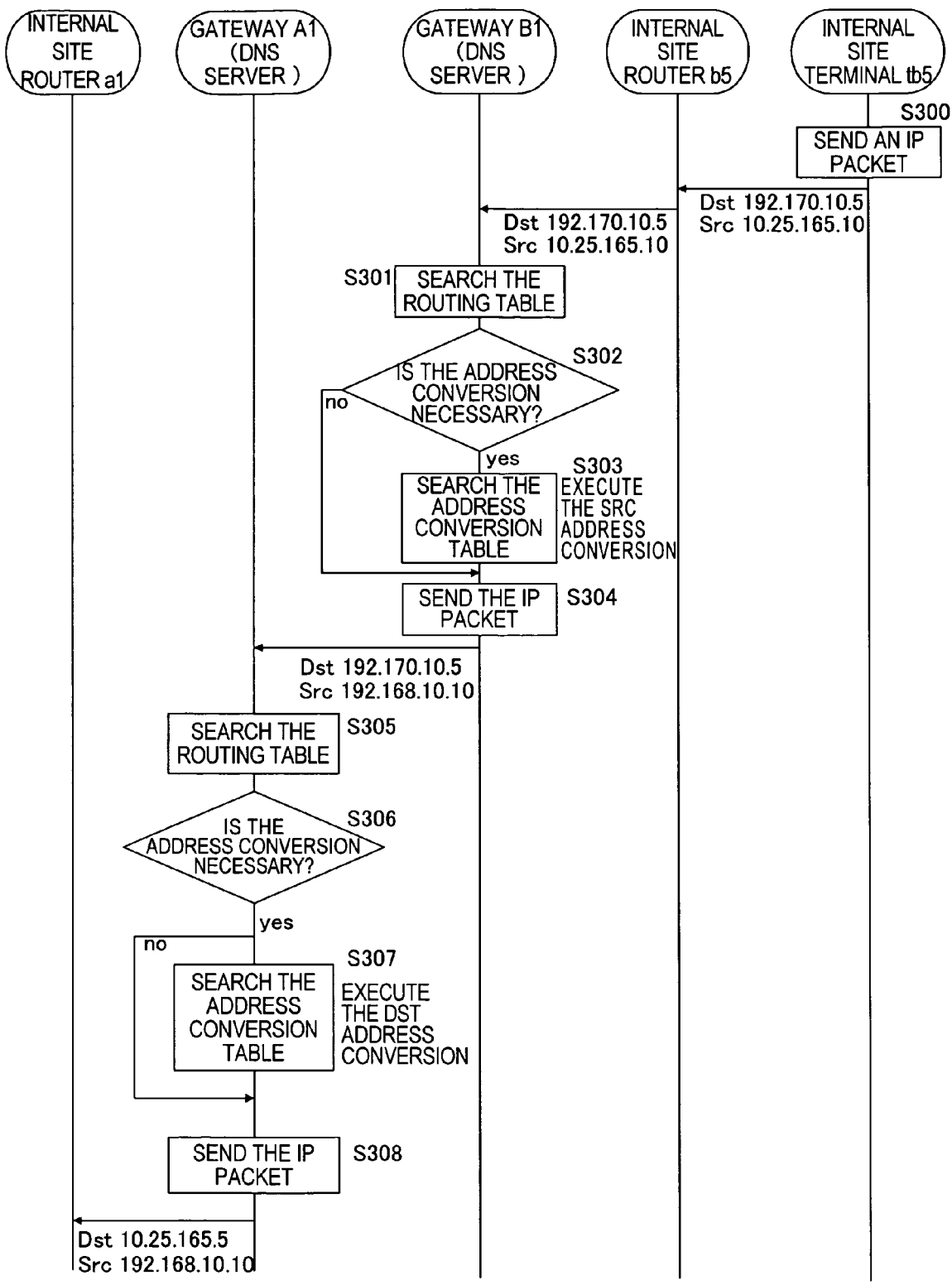
FIG. 17 shows a packet transfer sequence flowchart according to a second embodiment of the present invention.

FIG. 17 shows a packet transfer sequence flowchart according to the second embodiment of the present invention. The difference from the packet transfer sequence in the first embodiment is described below.

In the packet transfer sequence of the first embodiment shown in FIG. 12, the DST address is converted on the gateway B1 side, and the SRC address is converted on the gateway A1 side. In contrast, in the packet transfer sequence shown in FIG. 17, the SRC address is converted on the gateway B1 side, and the DST address is converted on the gateway A1 side.

For example, in S303 shown in FIG. 17, the gateway B1 searches the routing table, and selects the gateway A1 as a next hop router of the IP packet having a DST address 192.170.10.5. Since the address conversion flag S is set for the DST address 192.170.10.0/24, by referring to the SRC address conversion table (FIG. 6b) in the gateway B1, the gateway B1 converts the SRC address 10.25.165.0/24 into 192.168.10.10.

Then, in S305 shown in FIG. 17, the gateway A1 searches the routing table, and selects the internal site router a1 as a next hop router of the IP packet having the DST address 192.170.10.5. Since the address conversion flag D is set for the DST address 192.170.10.0/24, by referring to the DST address conversion table (FIG. 5a ) in the gateway A1, the gateway A1 converts the DST address 192.170.10.5 into 10.20.165.5.

Through the above sequence, the SRC address conversion on the SRC side and the DST address conversion on the DST side are realized.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A packet relaying method for relaying a packet from a first network to a second network,
    wherein first relaying apparatus in the first network and second relaying apparatus in the second network decide whether an identical network address mutually duplicated in between the first network and the second network exists, and
    when the identical network address exists, the first relaying apparatus distributes a first network address corresponding to the identical network address internally to the first network, and the second relaying apparatus distributes a second network address corresponding to the identical network address internally to the second network, and
    when the identical network address is included in a packet transferred from the first network to the second network via the first relaying apparatus and the second relaying apparatus, the first relaying apparatus converts the identical network address included in the received packet into the first network address, or the second relaying apparatus converts the identical address included in the received packet into the second network address, and
    wherein the first relaying apparatus attaches a first identifier to all the network addresses in the first network, and transmits messages containing all the network addresses with the first identifier attached thereto to the second relaying apparatus, and
    the second relaying apparatus attaches a second identifier to all the network addresses in the second network, and transmits messages containing all the network addresses with the second identifier attached thereto to the first relaying apparatus, and
    wherein the first relaying apparatus compares all the network addresses in the second network, being received from the second relaying apparatus, with all the network addresses in the first network, so as to decide whether or not the identical network address exists, and selects a converted network address for each identical network address from addresses which are not contained in the transmitted messages from both first and second relaying apparatuses; and
    the second relaying apparatus compares all the network addresses in the first network, being received from the first relaying apparatus, with all the network addresses in the second network, so as to decide whether or not the identical network address exists, and selects a converted network address for each identical network address from addresses which are not contained in the transmitted messages from both first and second relaying apparatuses.

2. The packet relaying method according to claim 1,
    wherein, when the first network address is included in the received packet, the first relaying apparatus converts the first network address into the identical network address, and
    when the second network address is included in the received packet, the second relaying apparatus converts the second network address into the identical network address.

3. A packet relaying method for relaying a packet from a first network to a second network,
    wherein first relaying apparatus in the first network and second relaying apparatus in the second network decide whether an identical network address mutually duplicated in between the first network and the second network exists, and
    when the identical network address exists, the first relaying apparatus distributes a first network address corresponding to the identical network address internally to the first network, and the second relaying apparatus distributes a second network address corresponding to the identical network address internally to the second network, and
    when the identical network address is included in a packet transferred from the first network to the second network via the first relaying apparatus and the second relaying apparatus, the first relaying apparatus converts the identical network address included in the received packet into the first network address, or the second relaying apparatus converts the identical address included in the received packet into the second network address, and
    wherein, when the first network address is included in the received packet, the first relaying apparatus converts the first network address into the identical network address, and
    when the second network address is included in the received packet, the second relaying apparatus converts the second network address into the identical network address, and
    wherein, when the identical network address is included as the source address of the packet, and the first network address is included as the destination address of the packet, the first relaying apparatus converts the first network address specified as destination address into the identical network address, and
    the second relaying apparatus converts the identical network address specified as source address into the second network address.

4. The packet relaying method according to claim 1,
    wherein, when the first network address is included in the received packet, the first relaying apparatus converts the first network address into the identical network address, and
    when the second network address is included in the received packet, the second relaying apparatus converts the second network address into the identical network address, and
    wherein, when the identical network address is included as the source address of the packet, and the second network address is included as the destination address of the packet, the first relaying apparatus converts the identical network address specified as source address into the first network address, and
    the second relaying apparatus converts the second network address specified as destination address into the identical network address.

5. The packet relaying method according to claim 4,
wherein the first relaying apparatus distributes the first network address internally to the second network via the second relaying apparatus, and the second relaying apparatus distributes the second network address internally to the first network via the first relaying apparatus.

6. A packet relaying system for relaying a packet from a first network to a second network, including first relaying apparatus in the first network and second relaying apparatus in the second network interconnected through a predetermined line, wherein first relaying apparatus in the first network and second relaying apparatus in the second network decide whether an identical network address mutually duplicated in between the first network and the second network exists, and when the identical network address exists, the first relaying apparatus distributes a first network address corresponding to the identical network address internally to the first network, and the second relaying apparatus distributes a second network address corresponding to the identical network address internally to the second network, and when the identical network address is included in a packet transferred from the first network to the second network via the first relaying apparatus and the second relaying apparatus, the first relaying apparatus converts the identical network address included in the received packet into the first network address, or the second relaying apparatus converts the identical address included in the received packet into the second network address, and wherein the first relaying apparatus attaches a first identifier to all the network addresses in the first network, and transmits messages containing all the network addresses with the first identifier attached thereto to the second relaying apparatus, and the second relaying apparatus attaches a second identifier to all the network addresses in the second network, and transmits messages containing all the network addresses with the second identifier attached thereto to the first relaying apparatus, and wherein the first relaying apparatus compares all the network addresses in the second network, being received from the second relaying apparatus, with all the network addresses in the first network, so as to decide whether or not the identical network address exists, and selects a converted network address for each identical network address from addresses which are not contained in the transmitted messages from both first and second relaying apparatuses; and the second relaying apparatus compares all the network addresses in the first network, being received from the first relaying apparatus, with all the network addresses in the second network, so as to decide whether or not the identical network address exists, and selects a converted network address for each identical network address from addresses which are not contained in the transmitted messages from both first and second relaying apparatuses.

7. The packet relaying system according to claim 6,
wherein, when the first network address is included in the received packet, the first relaying apparatus converts the first network address into the identical network address, and when the second network address is included in the received packet, the second relaying apparatus converts the second network address into the identical network address.

8. A packet relaying system for relaying a packet from a first network to a second network, including first relaying apparatus in the first network and second relaying apparatus in the second network interconnected through a predetermined line, wherein first relaying apparatus in the first network and second relaying apparatus in the second network decide whether an identical network address mutually duplicated in between the first network and the second network exists, and when the identical network address exists, the first relaying apparatus distributes a first network address corresponding to the identical network address internally to the first network, and the second relaying apparatus distributes a second network address corresponding to the identical network address internally to the second network, and when the identical network address is included in a packet transferred from the first network to the second network via the first relaying apparatus and the second relaying apparatus, the first relaying apparatus converts the identical network address included in the received packet into the first network address, or the second relaying apparatus converts the identical address included in the received packet into the second network address, and wherein, when the first network address is included in the received packet, the first relaying apparatus converts the first network address into the identical network address, and when the second network address is included in the received packet, the second relaying apparatus converts the second network address into the identical network address, and wherein, when the identical network address is included as the source address of the packet, and the first network address is included as the destination address of the packet, the first relaying apparatus converts the first network address specified as destination address into the identical network address, and the second relaying apparatus converts the identical network address specified as source address into the second network address.

9. The packet relaying system according to claim 6,
wherein, when the first network address is included in the received packet, the first relaying apparatus converts the first network address into the identical network address, and when the second network address is included in the received packet, the second relaying apparatus converts the second network address into the identical network address, and wherein, when the identical network address is included as the source address of the packet, and the second network address is included as the destination address of the packet, the first relaying apparatus converts the identical network address specified as source address into the first network address, and the second relaying apparatus converts the second network address specified as destination address into the identical network address.

10. The packet relaying system according to claim 9, wherein the first relaying apparatus distributes the first network address internally to the second network via the second relaying apparatus, and the second relaying apparatus distributes the second network address internally to the first network via the first relaying apparatus.

* * * * *